Aug. 21, 1928.   1,681,408
C. G. JOHANNESMEYER ET AL
TOOL HOLDER FOR METAL PLANERS
Filed Nov. 17, 1923    2 Sheets-Sheet 1

INVENTOR
CHARLES GEORGE JOHANNESMEYER
ALFRED R. McCANN
BY James N. Ramsey
ATTORNEY

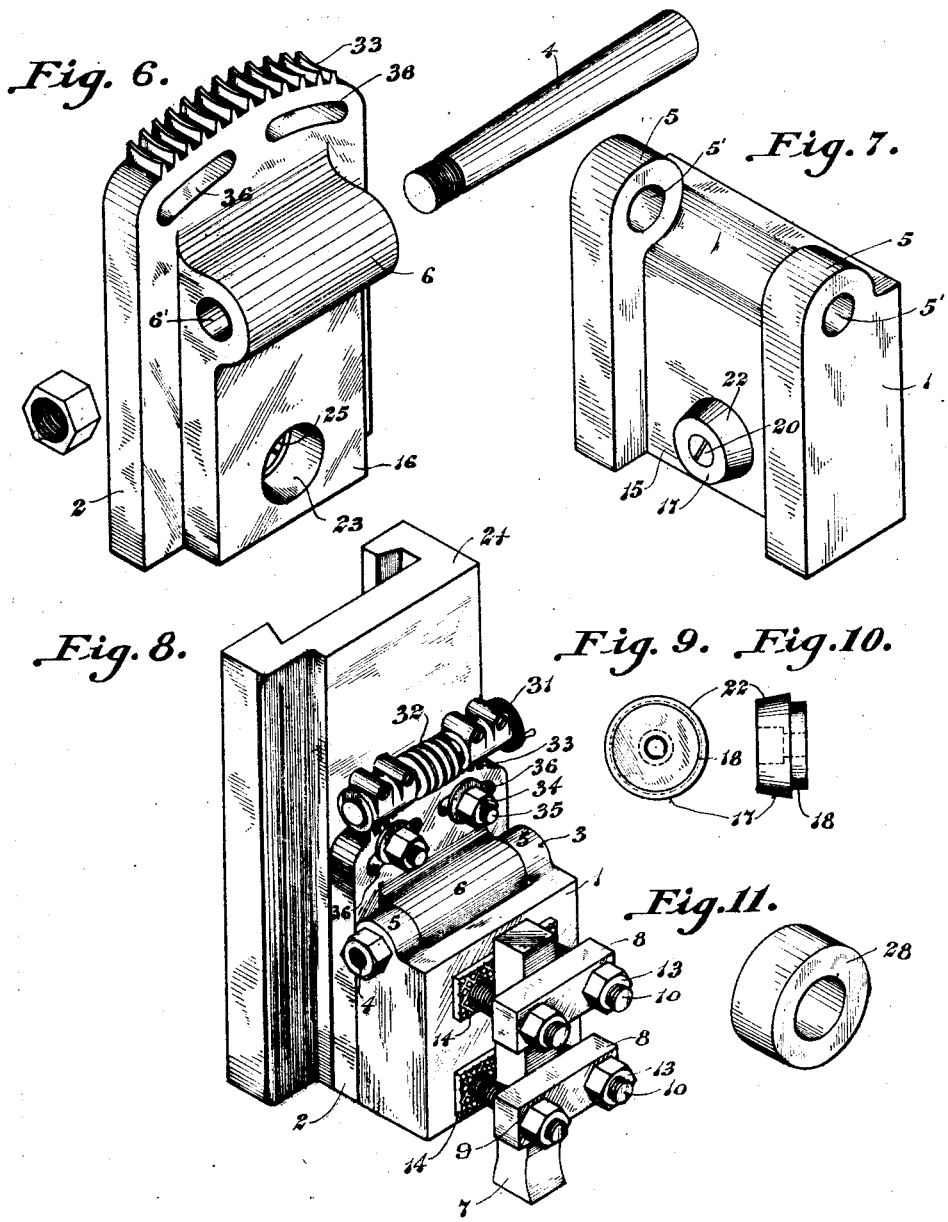

Patented Aug. 21, 1928.

1,681,408

UNITED STATES PATENT OFFICE.

CHARLES GEORGE JOHANNESMEYER, OF GLENDALE, AND ALFRED R. McCANN, OF HAMILTON, OHIO, ASSIGNORS TO THE LIBERTY MACHINE TOOL COMPANY, OF HAMILTON, OHIO, A CORPORATION OF OHIO.

TOOL HOLDER FOR METAL PLANERS.

Application filed November 17, 1923. Serial No. 675,409.

Our invention relates to a novel metal planer.

It is well known that the vibration (commonly referred to as "chatter") of a metal cutting tool is caused by insufficient stability of the tool in the support or holder thereof. It is generally and especially advantageous to provide a holder for a tool of this character having a minimized adaptability to "chatter". A "cut" of considerable depth may then be accomplished without the likelihood of excessive damage to the mechanism of the planer as well as with the capability of producing a finished product free from indentations and roughened surface in the shortest space of time, thereby, producing a highly efficient article at a low cost of manufacture.

The objects of our invention are to provide a tool holder for metal planers especially adapted to eliminate vibration whereby the tool is capable of taking a cut of considerable depth in the material without developing the highly objectionable "chatter"; to provide a tool holder for metal planers capable of producing a finished product having an exceptionally smooth surface irrespective of the depth of the cut; to provide a tool holder for metal planers conveniently adjusted to permit positioning the tool relative to the work for the purpose of finishing the work at an angle to the planer table.

Our invention consists in a clapper box having a hinged tool block thereon and pivotally connected to the tool slide and provided with an arc rack at the upper end thereof meshing with a worm gear adapted to manual actuation for the purpose of adjusting said clapper box to a desired angle and secured in position by nuts threaded to bolts fixed to the tool slide and extending through arc slots in the upper part of the clapper box; further, in a conical guide fixed to the hinged tool block and adapted to seat into a recess of like shape formed in the clapper box; further, in combination with a hinged tool block having a channeled inner surface adapted to snugly fit a rabbeted surface of the clapper box when the tool block is in closed position; and, further, in a cylindrical nut threaded to a pin adapted to act as a pivot for adjustment of the clapper box.

Our invention also consists in the construction, combination and arrangement of parts as herein set forth and claimed.

In the drawings:

Fig. 6 is a perspective view of our improved clapper box with taper pin and nut for hinging the tool block thereon;

Fig. 7 is a perspective view of our improved tool block;

Fig. 8 is a perspective view of our improved tool slide, clapper box and tool block with a tool secured therein;

Fig. 9 is an end elevation of our interlocking cone;

Fig. 10 is a side elevation of our interlocking cone; and

Fig. 11 is an enlarged perspective view of the collar.

Figure 1:
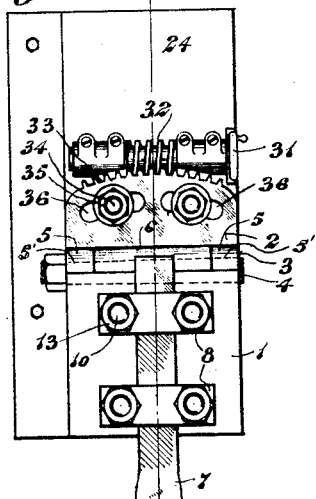
Fig. 1 is a front elevation of a clapper box showing the cutting tool secured therein.
Figure 2:
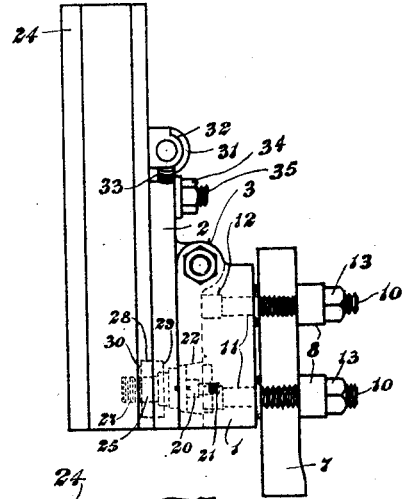
Fig. 2 is a side elevation of the same showing a beveled conical guide in dotted lines.
Figure 3:
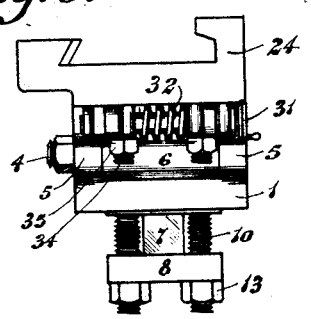
Fig. 3 is a plan view of a clapper box.
Figure 4:
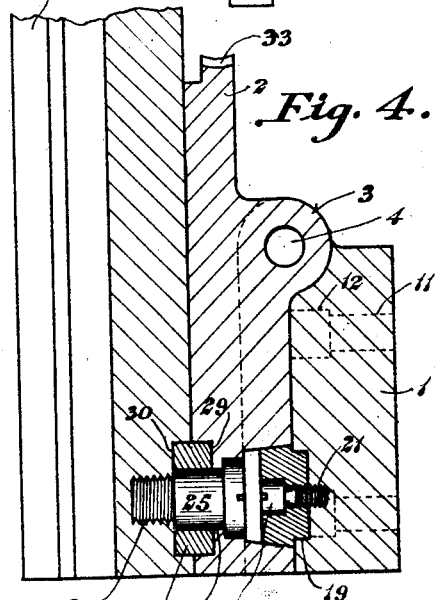
Fig. 4 is a sectional view taken on a line corresponding to 4—4 of Fig. 1, showing the hinged tool block in closed position.
Figure 5:
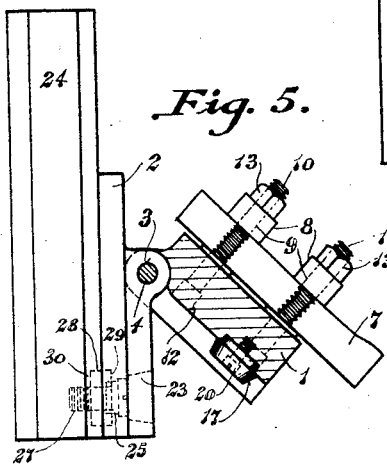
Fig. 5 is a side elevation of the clapper box showing the beveled conical guide in dotted lines and the hinged tool block in section as shown in Fig. 4 in an open position.

In the preferred construction of our device we provide tool block 1 pivotally connected to clapper box 2 by hinge 3 comprising tapered pin 4 extending through bearings 5' in bosses 5 integral with the tool block and through the bearing 6' in boss 6 integral with the clapper box. The tool block is provided with mechanism for securing tool 7 in the tool block comprising bars 8 extending transversely of the tool block and each having a hole at 9 near the ends thereof for receiving the bolts 10 secured in holes 11 of the tool block by head 12 of the bolts. The nuts 13 threaded to the outer ends of bolts 10, respectively, secure bars 8 in contact with tool 7 thereby securing the tool between said bars and tool engaging plates 14 adjacent the clapper box.

The faces of tool engaging plates 14 are preferably knurled or otherwise roughened to securely hold tool 7. The tool block is provided with channel 15 on the inner surface thereof and snugly fits rabbet 16 integral with clapper box 2 for the purpose of eliminating sidewise movement of the tool block when in closed position. For additional security against sidewise movement of the tool block as well as movements in other directions and for the purpose of lessening the strain on tapered pin 4 interlocking cone 17 having reduced cylindrical butt 18 snugly fits into circular recess 19 in the inner portion of tool block 1 and is secured therein against outward movement by screw 20 threaded in a hole at 21 in the tool block. The outer conical portion 22 of interlocking cone 17 snugly fits into a like shaped conical hole at 23 of the clapper box when the tool block is in closed position. To permit positioning tool 7 at any desired angle with the planer table, clapper box 2 is pivotally connected to tool slide 24 by stud 25 received in a hole at 26 and is threaded in a socket at 27 in the tool slide. Collar 28 around stud 25 cooperates with said stud 25 in forming the pivot and in preventing lateral movement of the clapper box by being combinedly received in recesses 29 and 30, respectively, of clapper box 2 and tool slide 24 and is designed for a snug fit therein. Collar 28 relieves stud 25 from any strain. A manually operated hand wheel 31 fixed to worm gear 32 meshing with arc rack 33 on the upper portion of clapper box 2 provides means for movement of the clapper box on its pivot formed by stud 25. The clapper box is secured against undesired movement on its pivot 25 by nuts 34 threaded to bolts 35 fixed in tool slide 24 and extending through arc slots 36 in the clapper box. Tightening nuts 34 engage the same with the clapper box, thereby securing it in contact with support 24. It is obvious that tool slide 24 is received by tool actuating member of a metal planer.

An important advantage of our invention is that a heavy cut, leaving a smooth surface, may be made without the usual chatter and without danger of breaking the tool while at the same time eliminating or reducing the number of operations required to do a given amount of work.

It is apparent that our invention is capable of some modification without departure from its scope or spirit as defined in the claims.

What we claim as new and desire to secure by Letters Patent is:

1. In a planer, the combination of a tool slide having a recess therein, a pivot mounted in said tool slide, concentric with said recess, a clapper box having a recess and a socket therein and connected to said pivot, a tool holder and means adapted to stabilize said tool holder comprising a channel on the inner surface thereof adapted to form a firm joint with said clapper box, an interlocking cone fixed to said tool holder and adapted to snugly fit in said socket, said pivot comprising a longitudinal pin having a collar there-around and combinedly cooperating with said recesses, substantially as and for the purposes set forth.

2. In a planer, the combination of a tool slide having a worm gear secured thereto and having a pivot mounted therein and having a recess therein, and having a bolt fixed thereto, a clapper box having an arced rack and an arced slot at the upper portion thereof and having a recess and a socket therein and having a rabbet thereon and connected to said pivot, said arced rack and said worm gear meshed, said bolt extending through said arced slot, a tool holder having a circular recess therein and a channel adapted to cooperate with said rabbet and hinged to said clapper box, an interlocking cone secured in said circular recess and adapted to snugly fit in said socket, a manually actuated hand wheel adapted to rotate said worm gear for swinging said clapper box at any desired angle, a collar around said pivot and cooperating with said recess for lessening the strain on said pivot and means for retaining said clapper box in any desired angle relative to said tool slide comprising a nut threaded to said bolt.

3. In a planer, a tool slide having a recess therein, a clapper box thereon having a hole therethrough with a recess on its outer side around said hole and with a recess of larger diameter on its inner side around said hole in registry with said first-mentioned recess, a collar mounted in said registering recesses and a pivot-stud extending through said hole and collar and screwed into said tool slide and having its head fitting in said outer recess and bearing against a flange between the recesses in the clapper box whereby said clapper box is pivotally mounted and held on said tool slide and the screw of said pivot-stud is relieved from side or lateral thrust.

CHARLES GEORGE JOHANNESMEYER.
ALFRED R. McCANN.